US008611858B2

(12) United States Patent
Uchida (10) Patent No.: US 8,611,858 B2
(45) Date of Patent: Dec. 17, 2013

(54) MOBILE TERMINAL THAT ALLOWS A SERVER TO MANAGE CONFIDENTIAL INFORMATION (75) Inventor: Kaoru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/559,794

(22) Filed: Jul. 27, 2012

(65) Prior Publication Data

US 2012/0289194 A1 Nov. 15, 2012

Related U.S. Application Data (63) Continuation of application No. 12/525,720, filed as application No. PCT/JP2008/051500 on Jan. 31, 2008, now Pat. No. 8,254,883.

(30) Foreign Application Priority Data

Feb. 7, 2007 (JP) .................................. 2007028586

(51) Int. Cl.
*H04M 1/66* (2006.01)
*H04L 12/58* (2006.01)

(52) U.S. Cl.
USPC ....................................... 455/410; 455/412.1

(58) Field of Classification Search
USPC .............................................. 455/410, 412.1
See application file for complete search history.

(56) References Cited

U.S. PATENT DOCUMENTS

2003/0004881 A1* 1/2003 Shinzaki et al. ................ 705/51
2004/0204124 A1* 10/2004 Campbell ...................... 455/566

* cited by examiner

*Primary Examiner* — Kamran Afshar
*Assistant Examiner* — Omoniyi Obayanju (57) ABSTRACT To provide a communication system including a mobile terminal which can prevent leak of information even if the mobile terminal is lost and reproduce previously accumulated confidential data without losing newly created and updated confidential data. A mobile terminal includes connection state judging device which detects a line connection state with a server. When the line connection state is a broadband connection, the data is read directly from and written directly into a data storing device of the server. When the line connection state is a narrowband connection, the data is temporarily read out and written into a data storing device of the terminal. When the operation of the mobile terminal is completed or a security operation starting instruction is issued by a user, the updated confidential data is written into the data storing device of the server and then the confidential data is erased from the mobile terminal.

11 Claims, 9 Drawing Sheets

MOBILE TERMINAL THAT ALLOWS A SERVER TO MANAGE CONFIDENTIAL INFORMATION

REFERENCE TO RELATED APPLICATION

This application is a continuation application of Ser. No. 12/525,720 filed on Aug. 4, 2009 and claims the benefit of the priority of Japanese patent application No. 2007-028586 filed on Sep. 28, 2005, the disclosure of which is incorporated herein in its entirety by reference thereto.

TECHNICAL FIELD

The present invention relates to a communication system including a mobile terminal, a security method for the mobile terminal, and a program thereof.

BACKGROUND ART

Since a phonebook and reception/transmission mail addresses are stored in a mobile phone usually and accessed to be referred to or to be changed, there is a possibility that such information is read by a third person and personal information or the like are leaked when the mobile phone is lost. To deal with such problems, a phonebook management system in which phonebook data and the like are uploaded into a server provided in a network of a wireless provider, to be downloaded according to a request from the mobile phone side as necessary has been proposed (Patent Document 1).

Also, there has been proposed a data access device with which the phonebook data and the like are uploaded in a server, and when the data is transferred and displayed on the mobile phone, confidential information is stored in a volatile memory and general information is stored in a non-volatile memory, so that the confidential information is not remained in the mobile phone once the power is off (Patent Document 2). Further, a mobile phone configured such that dial lock or data erasing can be performed from a radio base station, even after the mobile phone is lost, has been also proposed (Patent Document 3).

Patent Document 1: Japanese Patent Application Laid-Open No. 2002-57807
Patent Document 2: Japanese Patent Application Laid-Open No. 2003-223368
Patent Document 3: Japanese Patent Application Laid-Open No. 2003-319453

DISCLOSURE OF THE INVENTION

Problems to be Solved by the Invention

However, with the security systems shown in Patent Document 1 and Patent Document 2 described above, there is such a possibility that newly created or updated confidential data is erased without being transferred to the server depending on a line connection state at a time when an operation of the mobile phone is completed. Also, with the method of Patent Document 3, though it is possible to lock the dial or erase the stored data after the mobile phone is lost, reproduction of the stored data is not possible.

It is an exemplary object of the present invention to provide a communication system including a mobile terminal which can prevent leak of information when the mobile terminal is lost and reproduce the previously accumulated data even after the mobile terminal is lost, a communication method, and a program thereof.

Means for Solving the Problems

In order to achieve the foregoing exemplary object, a communication system according to the invention is a system including a mobile terminal for performing a communication and a server for managing information needed for the communication performed by the mobile terminal, in which:

the server transfers, responding to a request from the mobile terminal, communication information managed by the server to the requesting mobile terminal, and stores and manages collectively the communication information transferred from the requesting mobile terminal; and the mobile terminal judges a communication state with the server, receives the communication information from the server based on the judgment result, and makes the server manage the communication information collectively when the communication is completed.

While the present invention is described to be constructed as the communication system as hardware, the present invention is not limited to such case, and the present invention may be constructed as the mobile terminal as hardware, a communication method, or a security program as software.

A mobile terminal according to the invention is a terminal which performs communication based on communication information managed by a server, And the mobile terminal is configured so as to judge a communication state with the server, receive the communication information from the server based on the judgment result, and make the server manage the communication information collectively when the communication is completed.

A security program according to the invention is configured so as to cause a microprocessor of a mobile terminal, which performs communication based on communication information managed by a server, to execute:

a function of judging a communication state with the server and receiving the communication information from the server based on the judgment result; and a function of transferring the communication information to the server when the communication is completed.

A communication method according to the invention is a method of performing a communication using a mobile terminal by combining the mobile terminal for performing a communication and a server for managing information needed for the communication performed by the mobile terminal, and the method includes:

transferring communication information managed by the server responding to a request from the mobile terminal to the requesting mobile terminal, storing and managing the communication information transferred from the requesting mobile terminal collectively by the server; and judging a communication state with the server by the mobile terminal, transferring the communication information from the server to the mobile terminal based on the judgment result, and managing the communication information by the server collectively when the communication is completed.

Effect of the Invention

With the present invention, when the user is not using the mobile terminal, or when the user is using the mobile terminal with the line to the server being connected, the communication information needed for the communication of the mobile terminal is stored in the server. Therefore, if the mobile terminal is lost, highly confidential communication information is not possible to be known by others.

BEST MODE FOR CARRYING OUT THE INVENTION

Next, an exemplary embodiment of the invention is explained hereinafter in detail by referring to attached drawings.

Figure 1:
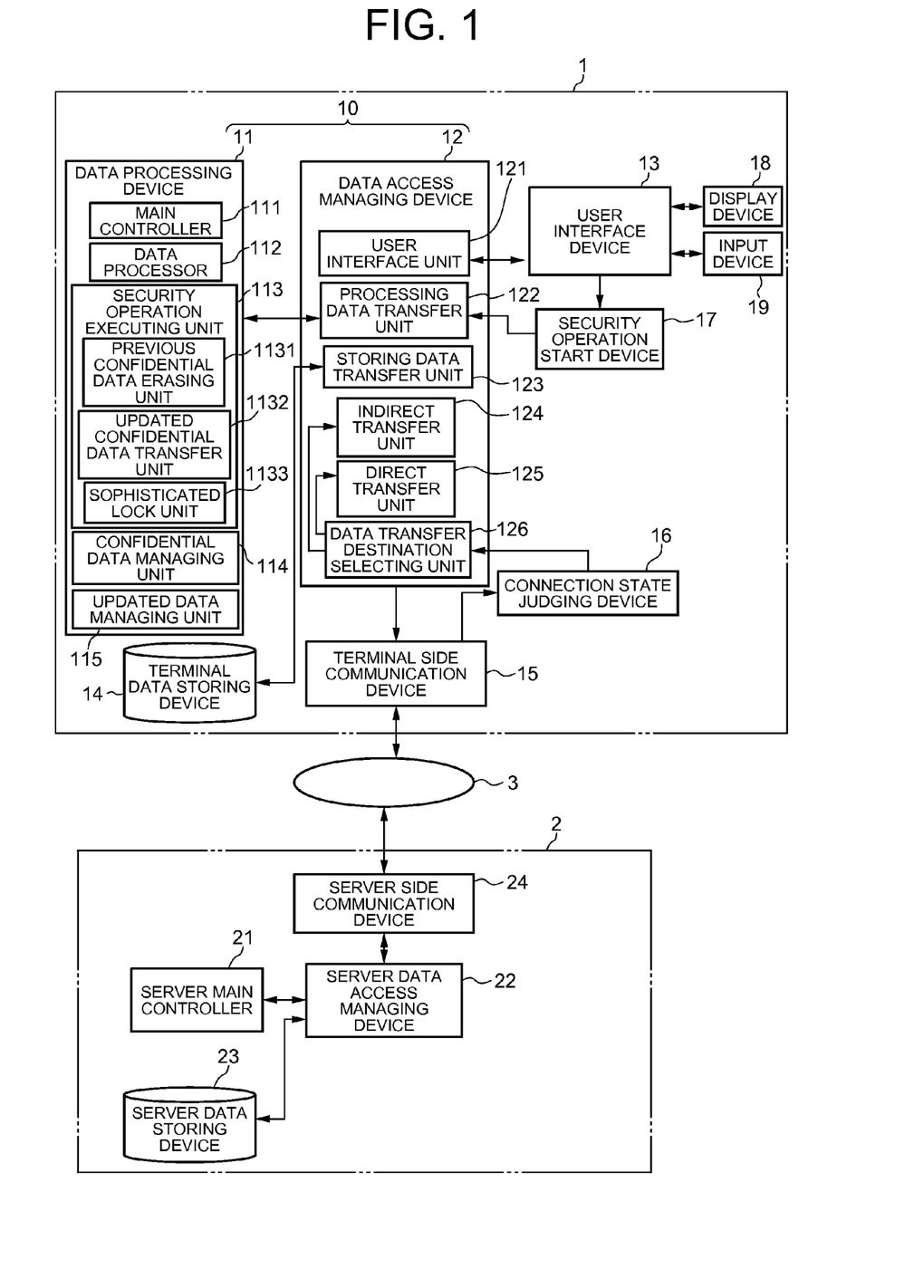
FIG. 1 is a block diagram showing a configuration of the first exemplary embodiment of the communication system according to the invention.
Figure 8:
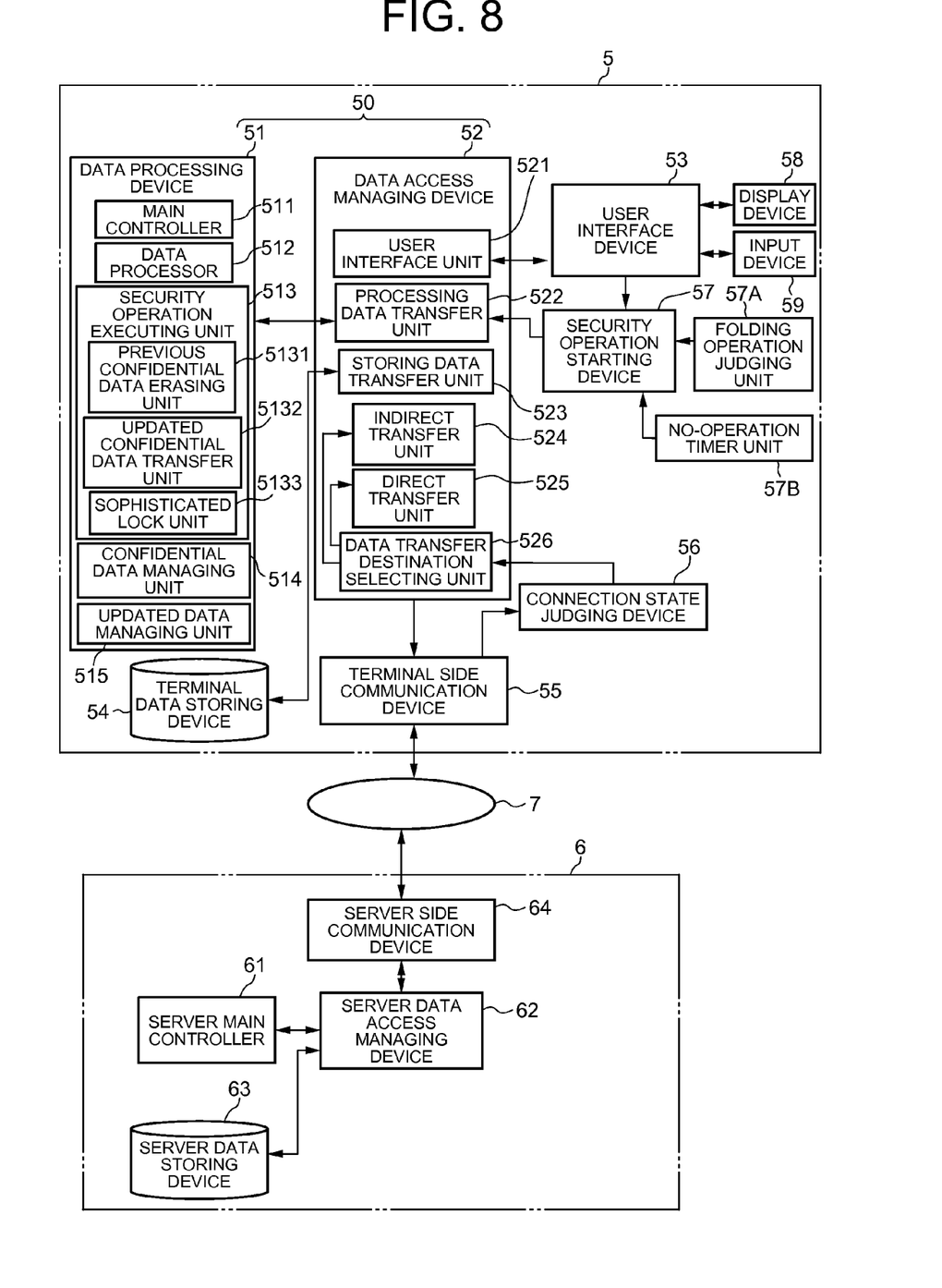
FIG. 8 is a block diagram showing the configuration according to the second exemplary embodiment of the invention.

A communication system according to an exemplary embodiment of the invention is a system including a mobile terminal 1 for performing a communication and a server 2 for managing information needed for the communication performed by the mobile terminal 1 as shown in FIGS. 1 and 8, and the system is basically configured in such a manner that:

the server 2 transfers, responding to a request from the mobile terminal 1, the communication information managed by the server 2 to the requesting mobile terminal 1, and stores and manages collectively the communication information transferred from the requesting mobile terminal 1, while the mobile terminal 1 judges a communication state with the server 2, receives the communication state from the server 2 based on the judgment result, and makes the server 2 manage the communication information collectively when the communication is completed.

With the exemplary embodiment of the invention, the communication information which is stored and managed by the server 2 is transferred to the requesting mobile terminal 1 responding to the request from the mobile terminal 1. Upon receiving the communication information from the server 2, the mobile terminal 1 performs communication based on the communication information.

The mobile terminal 1 contains information which is not desired to be disclosed to others, in addition to information which may be disclosed to others. As examples of the information which is not desired to be disclosed to others, there are a telephone number and mail address of other person. When the mobile terminal 1 is lost, such information may be disclosed to others, and may be misused. Such cases can be avoided by preventing the information from being disclosed by using passwords or the like. However, as long as the communication information remains in the mobile terminal 1, there is a possibility that the communication information is leaked in any way.

Therefore, in the exemplary embodiment of the present invention, when the mobile terminal 1 is not being used, communication information in the mobile terminal 1 (telephone number and mail address of other person, for example) is transferred to the server 2, and the server 2 manages the communication information collectively. And at a time when the mobile terminal 1 is to be used, the communication information collectively managed by the server 2 is downloaded from the server 2 to the requesting mobile terminal 1, and the communication information is stored in the mobile terminal 1 temporarily.

The user performs communication by using the communication information downloaded to the mobile terminal 1. When the user uses the mobile terminal 1, the communication information downloaded from the server 2 may be updated along with the communication. When the user completes the communication by using the mobile terminal 1, the mobile terminal 1 transmits the communication information temporarily stored in the mobile terminal 1 to the server 2, including the updated information. When receiving the communication information transmitted from the mobile terminal 1, the server 2 stores and manages the communication information, in place of the mobile terminal 1. In this case, when the mobile terminal 1 transmits the communication information to the server 2, the mobile terminal 1 may erase the communication information temporarily stored in the mobile terminal 1.

Further, in the exemplary embodiment of the invention, when the mobile terminal 1 performs communication, the mobile terminal 1 does not download the communication information from the server 2 unlimitedly, but the mobile terminal 1 judges the connection state with the server 2, and downloads the communication information based on the judgment result. Accordingly, the mobile terminal 1 transmits/receives the communication information to/from the server 2 only when the connecting relation between the mobile terminal 1 and the server 2 is in an optimum state for: downloading the communication information from the server 2 to the mobile terminal 1; and, uploading the communication information from the mobile terminal 1 to the server 2.

According to the exemplary embodiment of the invention, the communication information is downloaded from the server 2 to perform the communication only when the communication is performed by using the mobile terminal 1. Therefore, the information needed for the communication of the mobile terminal 1 is to be managed by the server 2 instead of the mobile terminal 1. Accordingly, if the mobile terminal 1 is lost, since important information is not present in the mobile terminal 1, the security of the mobile terminal 1 can be enhanced.

Also, according to the exemplary embodiment of the invention, the connection state between the mobile terminal 1 and the server 2 is judged, and based on the judgment result, the communication information is downloaded from the server 2 to the mobile terminal 1. When the communication is completed, the communication information is transmitted from the mobile terminal 1 to the server 2, and the server 2 stores and manages the communication information collectively. Further, the communication information is transmitted/received only when the connection between the mobile terminal 1 and the server 2 is in an optimum state. Consequently, the communication by the mobile terminal 1 can be performed based on the communication information at a time of the completion of the previous communication, so the user does not feel discomfort even when the server 2 manages the communication information of the mobile terminal 1 collectively, and the communication can be performed any time based on the communication information accumulated by the user.

Next, an exemplary embodiment of the invention will be explained hereinafter in detail by referring to a specified example.

(First Exemplary Embodiment)

FIG. 1 is a block diagram showing a basic structure of the first exemplary embodiment of the invention. The first exemplary embodiment of the invention includes a mobile terminal 1 and a server 2 connected to the mobile terminal 1 via a communication network 3.

The server 2 includes: a server main controller 21 which controls the entire server; a server data access managing device 22 which manages the transfer of the data or communication performed within the server; a server data storing device 23 which stores the data in the server; and a server communication device 24 which connects the communication with the mobile terminal 1.

The mobile terminal 1 includes: a data processing device 11 which controls the entire mobile terminal and processes the data; a data access managing device 12 which manages the transfer of the data or communication performed within the mobile terminal; a user interface device 13 which controls the data transfer performed between an input device 19 to which data is inputted from the user and a display device 18 which displays an output to the user; a terminal data storing device 14 which stores the data; a terminal communication device 15 which connects the communication to the server 2 and other mobile terminal via the communication network 3; a connection state judging device 16 which judges the connection state with the server 2 via the terminal communication device 15; and a security operation start device 17 which instructs the data processing device 11 via the data access managing device 12 to execute a predetermined security operation by the input from the user. Note that a calculation control unit 10 is configured with the data processing device 11 and the data access managing device 12.

Further, the data processing device 11 includes: a main controller 111 which controls an operation of the entire mobile terminal 1; a data processor 112 which executes reading, creation, update, erasing, writing, and the like, of the data; a security operation executing unit 113 which executes the security operation when the operation of the terminal is completed or when being started by the security operation start device 17; a confidential data managing unit 114 which manages confidential data to be stored in the terminal data storing device 14 by adding a confidential flag to the confidential data; an updated data managing unit 115 which manages updated data that is newly created and updated data to be stored in the terminal data storing device 14 by adding an update flag to the updated data; and the like.

Also, the data access managing device 12 includes: a user interface unit 121 which executes the data transfer with the user interface device 13; a processing data transfer unit 122 which executes the data transfer with the data processing device 11; a storing data transfer unit 123 which executes the data transfer with the terminal data storing device 14; a direct transfer unit 125 which executes the data transfer directly with the server data storing device 23 of the server 2 via the terminal communication device 15; an indirect transfer unit 124 which obtains the data from the server data storing device 23 of the server 2 via the terminal communication device 15 after storing the data in the terminal data storing device 14 temporarily, or, writes the data into the server data storing device 23 of the server 2 via the terminal communication device 15 after storing the data in the terminal data storing device 14 temporarily; a data transfer destination selecting unit 126 which selects one of the indirect transfer unit 124 and the direct transfer unit 125 when the data is transferred based on the line connection state judged by the connection state judging device 16; and the like.

In general, the phonebook data, containing personal information such as the telephone numbers and mail addresses of other persons, and e-mails received from other persons or transmitted from the user to other persons, are stored in the terminal data storing device 14 within the mobile terminal 1, and the data is accessed for reading or writing by the operation of the user, via the user interface device 13.

Figure 2:
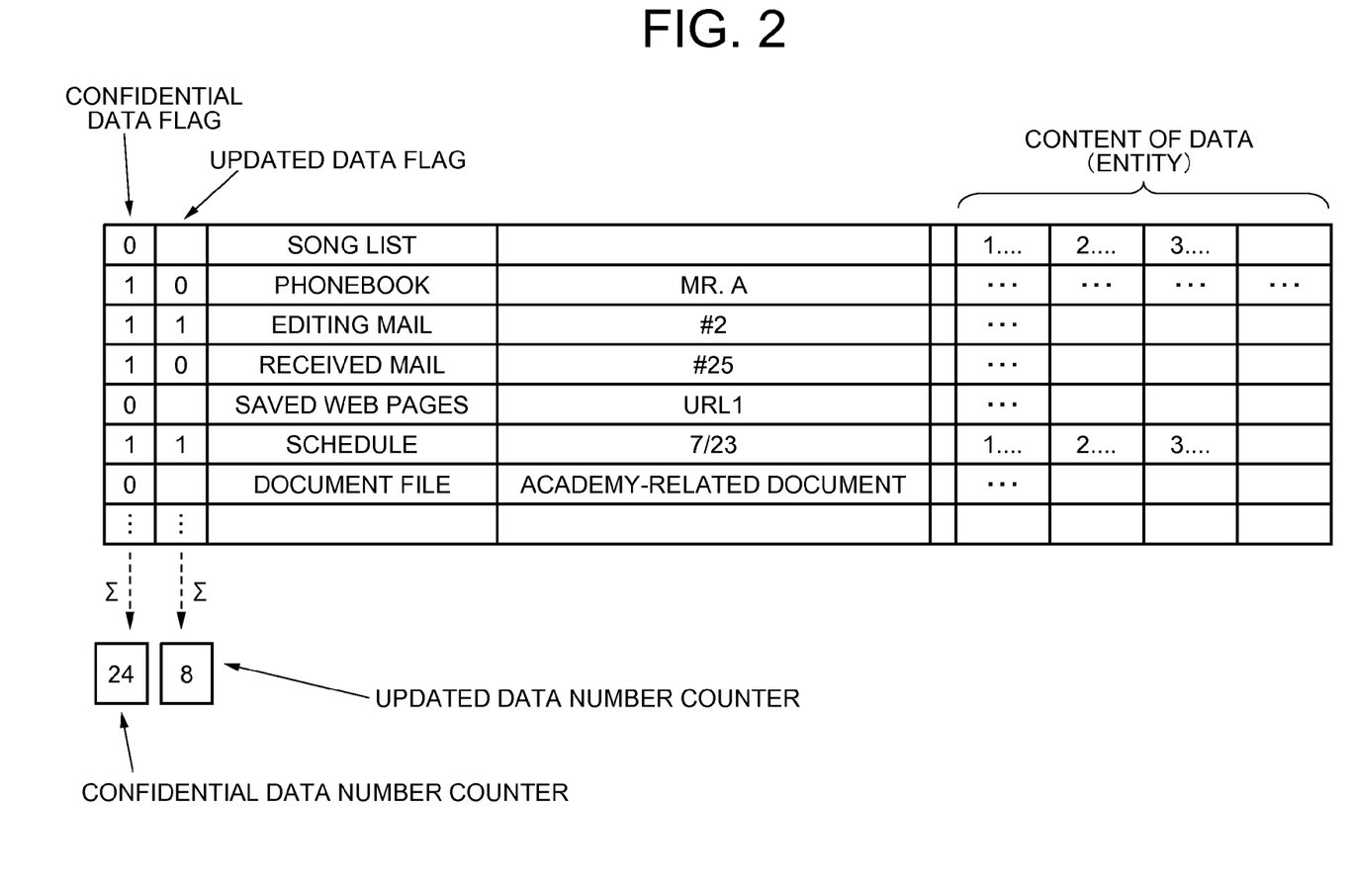
FIG. 2 is an explanatory diagram showing a storing form of data to be stored in the terminal data storing device in the first exemplary embodiment shown in FIG. 1.

FIG. 2 is an explanatory diagram showing a storing form of data which is stored in the terminal data storing device 14 according to the first exemplary embodiment of the invention. To the data in the terminal data storing device 14, both of a flag for indicating confidential data and a flag for indicating updated data are added to respective data units as shown in FIG. 2. When the flag is "on" the corresponding data (corresponded), the flag shows "1", and when the flag is "off" the corresponding data (not corresponded), the flag shows "0". The user can designate the data to be defined as the confidential data. For example, in the case shown in FIG. 2, the phonebook data, mail, and the like are designated as the confidential data, and such as a song list is designated as the general data.

These flags are updated as needed according to the state of the data in the terminal. The confidential flag being "on" means that the data is the confidential data and is required to be erased from the terminal under normal circumstances. The updated flag being "on" means that the data is updated only within the terminal and is required to be written into the server 2 before erased from the terminal. Further, sum of the number of "1" for the confidential data flag is calculated in a confidential data number counter for showing the number of pieces of the confidential data being in the terminal currently, and sum of the number of "1" for the updated data flag is calculated in a updated data number counter for showing the number of pieces of the updated data being in the terminal currently.

The data access managing device 12 shown in FIG. 1 obtains information about the line connection state between the mobile terminal 1 and the server 2 by an output from the connection state judging device 16 when an instruction to access the data is issued from the user interface device 13 or the data processing device 11. The connection state judging device 16 judges the state of the mobile terminal 1 from among the states such that: the mobile terminal 1 and the server 2 are connected with a communication bandwidth being at a level called "broadband" which is sufficient to transmit the data; the mobile terminal 1 and the server 2 are connected with a narrower communication bandwidth which is at a normal dial up level; and, the mobile terminal 1 is not in a connection state, being out of the communication area with the radio wave.

The data transfer destination selecting unit 126 selects one of: the direct transfer unit 125 which accesses to the server data storing device 23 of the server 2 directly; and an indirect transfer unit 124 which accesses to the server data storing device 23 via the terminal data storing device 14.

When accessing to the data stored in the server data storing device 23 of the server 2 directly from the data access managing device 12, the direct transfer unit 125 is used. The data read-out request from the mobile terminal 1 is sent to the server side via the terminal communication device 15 of the mobile terminal 1 and the server communication device 24 of the server 2, the data read-out request is converted to a read-out request to read the server data storing device 23 by the server data access managing device 22, and the data is read out from the server data storing device 23. The read out data is sent to the data access managing device 12 of the mobile terminal 1 through a reversed route via the server communication device 24 and the terminal communication device 15, sent to the data processing device 11 via the data processing transfer unit 122, and the data is used, or, again written into the terminal data storing device 14 as needed.

Similarly, in a case when the data write-in request is sent from the mobile terminal 1, the data write-in request from the mobile terminal 1 is sent to the server side via the terminal communication device 15 of the mobile terminal 1 and the server communication device 24 of the server 2, the data write-in request is converted to a write-in request to the server data storing device 23 by the server data access managing device 22, and the data is written into the server data storing device 23. Needless to say, these accesses are encrypted with a mutually-agreed appropriate protocol, and performed surely by taking countermeasures against a communication error. The security operation start device 17 instructs the data access managing device 12 to perform a prescribed security operation which will be described later, when the user instructs by means of, for example, pushing a security operation start button.

Figure 3:
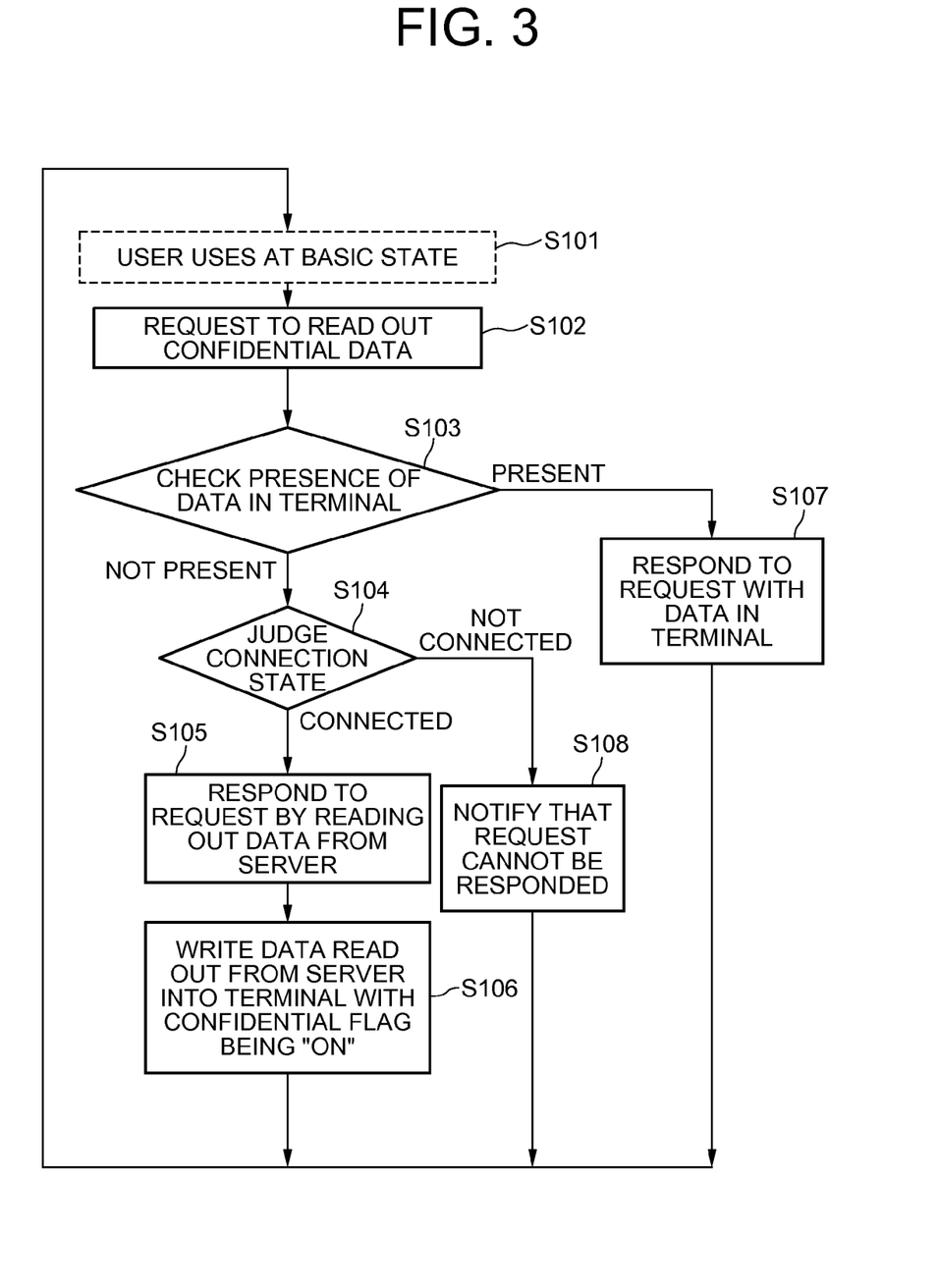
FIG. 3 is a flowchart showing the read-out operation of the confidential data when the data transfer from the server to the mobile terminal is performed by the indirect transfer function according to the first exemplary embodiment of the invention.

FIG. 3 is a flowchart showing a flow of the operations performed in the first exemplary embodiment of the invention when the data is transferred from the server 2 to the mobile terminal 1 by the indirect transfer unit 124 and an instruction for reading out the confidential data is issued.

When the user uses the mobile terminal 1 at the basic state (step S101), and if an instruction for reading out the confidential data (for example, a phonebook data about Mr. A) is issued from the user via the user interface device 13, or from the data processing device 11, it is judged at first whether the data is present in the terminal data storing device 14 in the terminal (step S103). If present, the data is read out, to respond the access request (step S107). After that, the state returns to the basic state (step S101).

If the data is not present, the connection state judging device 16 judges a current connection state. When the data is not present in the terminal and the mobile terminal 1 is not connected, the data read-out request is not responded, and it is displayed to the user that the request is not able to be responded, then the user has to wait until the terminal is connected (step S108).

When the data is not present in the mobile terminal 1 and the mobile terminal 1 is connected to the server 2, the read-out request for the confidential data is sent to the server 2 as it is, and the data read out from the server 2 accordingly is returned to the data access managing device 12 of the mobile terminal 1 (step S105). And the data is used as access result data. Also, the confidential data read out from the server 2 is stored in the terminal data storing device 14 in the mobile terminal 1 with a confidential flag being "on" (step S106). The confidential flag being "on" means that the data is the confidential data and is required to be erased from the mobile terminal 1 under normal circumstances.

Figure 4:
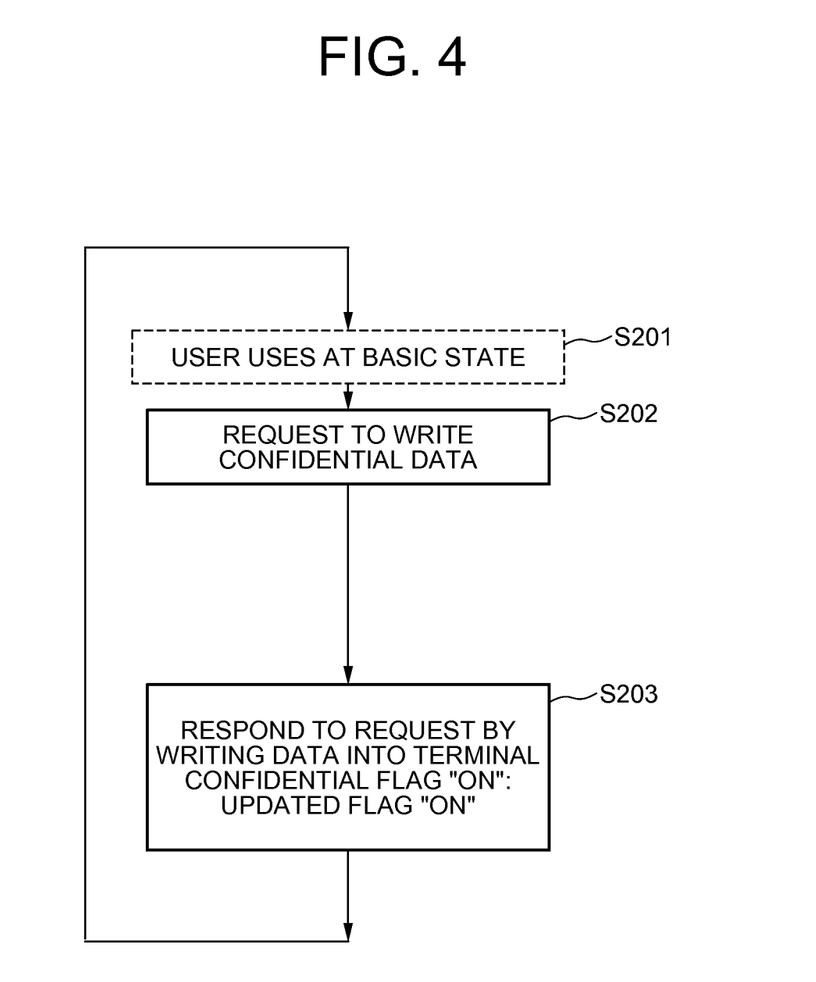
FIG. 4 is a flowchart showing the write-in operation of the confidential data when the data transfer from the mobile terminal to the server is performed by the indirect transfer function according to the first exemplary embodiment of the invention.

FIG. 4 is a flowchart showing a flow of the operations performed in the first exemplary embodiment of the invention when the data is transferred from the mobile terminal 1 to the server 2 by the indirect transfer unit 124 and an instruction for writing-in the confidential data is issued.

When the user uses the mobile terminal 1 at the basic state (step S201), and if a write-in request for writing the confidential data (for example, #2 of an editing mail) into the terminal data storing device 14 is issued from the user via the user interface device 13, or from the data processing device 11 (step S202), the data is processed in the mobile terminal 1 and stored in the terminal data storing device 14 in the mobile terminal 1 with the update flag being "on" or the confidential flag being "on" (step S203). The confidential flag being "on" means that the data is the confidential data and is required to be erased from the terminal under normal circumstances. The update flag being "on" means that the data is updated only within the mobile terminal 1 and is required to be written into the server data storing device 23 of the server 2 before erased from the mobile terminal 1.

Examples shown in the flowcharts of FIG. 3 and FIG. 4 adopt such a policy that a process which can be performed in the terminal is controlled to be performed in the terminal as much as possible, and all the confidential data is erased at a timing when the security operation is instructed. Next, described is another example which is configured such that a time period during which the confidential data is present in the mobile terminal 1 is shortened as much as possible by using the indirect transmit unit 124 and direct transmit unit 125.

Figure 5:
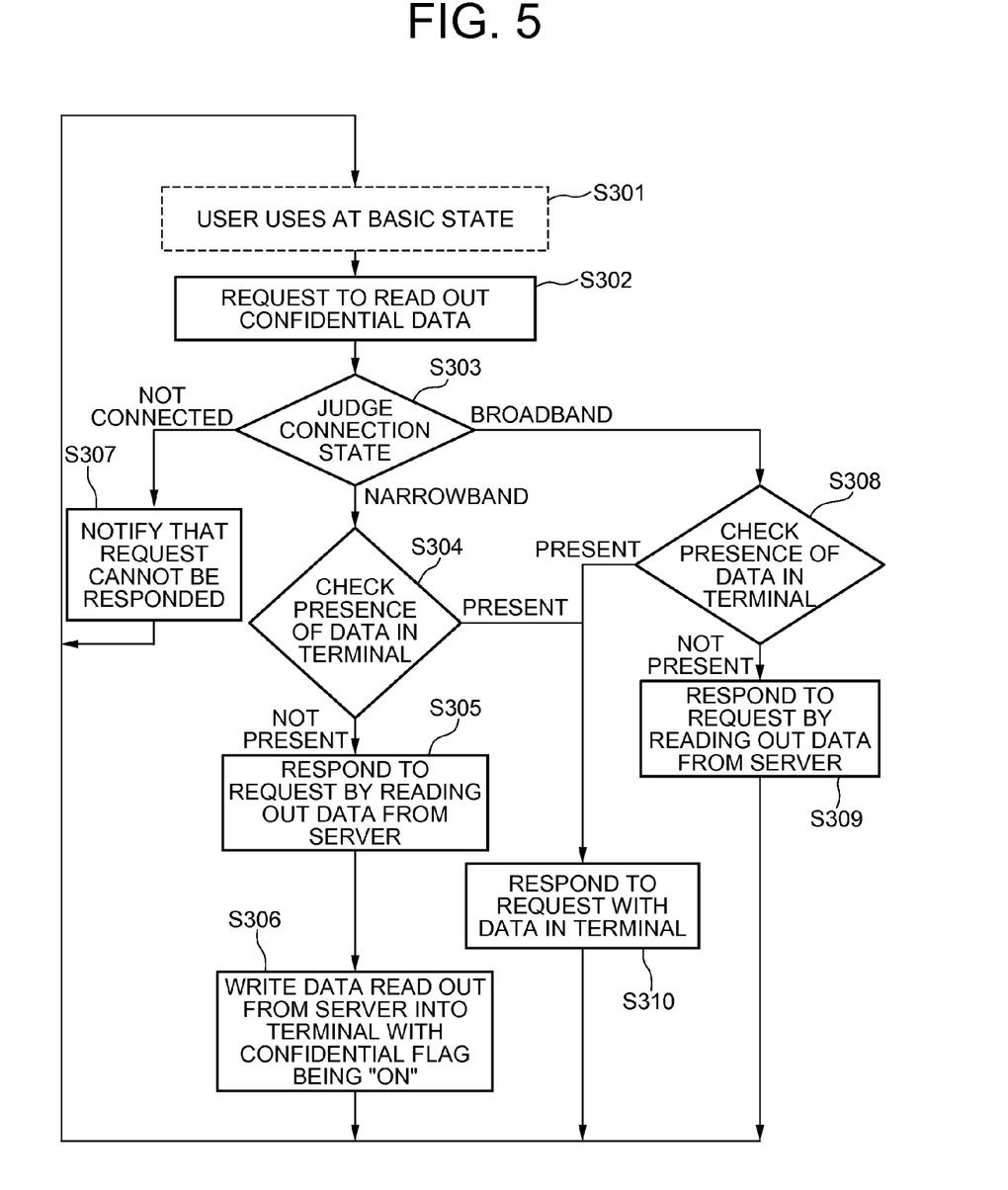
FIG. 5 is a flowchart showing the read-out operation of the confidential data when the data transfer from the server to the mobile terminal is performed by the indirect transfer function or the direct transfer function according to the first exemplary embodiment of the invention.

FIG. 5 shows a flow of operations in a case when: the user uses the mobile terminal 1 in the first exemplary embodiment; the read-out request of the confidential data in the terminal data storing device 14 is issued from the user or the data processing device 11; and the indirect transfer unit 124 and direct transfer unit 125 are used.

First, it is assumed that the user's mobile terminal 1 is being used in the basic state (step S301). Here, when the confidential data read-out request is issued (step S302), the connection state judging device 16 judges a current connection state at first (step S303).

When the mobile terminal 1 is not being connected because the mobile terminal 1 is outside a communication area or else, the data read-out request is not responded, and it is displayed to the user that the request is not able to be responded (step S307), then the user has to wait until the terminal is connected.

When the mobile terminal 1 is being connected, it is checked further whether the connection state is the broadband connection and there is a room for the communication line, or the connection state is the narrowband connection and there is no room for the communication line by the connection state judging device 16, and based on the judging result, the data transfer destination selecting unit 126 selects the direct transfer unit 125 when it is the broadband connection, and selects the indirect transfer unit 124 when it is the narrowband connection.

When the connection state is the broadband connection and the direct transfer unit 125 is selected, it is judged whether the data is present in the terminal data storing device 14 of the mobile terminal 1 at first (step S308), and if present, the data is read out and the access request is responded thereby (step S310). When the data is not present in the terminal data storing device 14, the confidential data read-out request is sent to the server 2 as it is, and the data read out from the server data storing device 23 of the server 2 accordingly is used as access result data, thereby the request is responded (step S309).

When the connection state is the narrowband connection and the indirect transfer unit 124 is selected, it is judged whether the data is present in the terminal data storing device 14 of the mobile terminal 1, and if present, the data is read out and the access request is responded thereby (step S310). When the data is not present in the terminal data storing device, the confidential data read-out request is sent to the server as it is, and the data read out from the server accordingly is returned to the data access managing device of the mobile terminal and used as access result data (step S305). Also, the data read out from the server is stored in the terminal data storing device in the terminal with the confidential flag being "on" (step S306).

Figure 6:
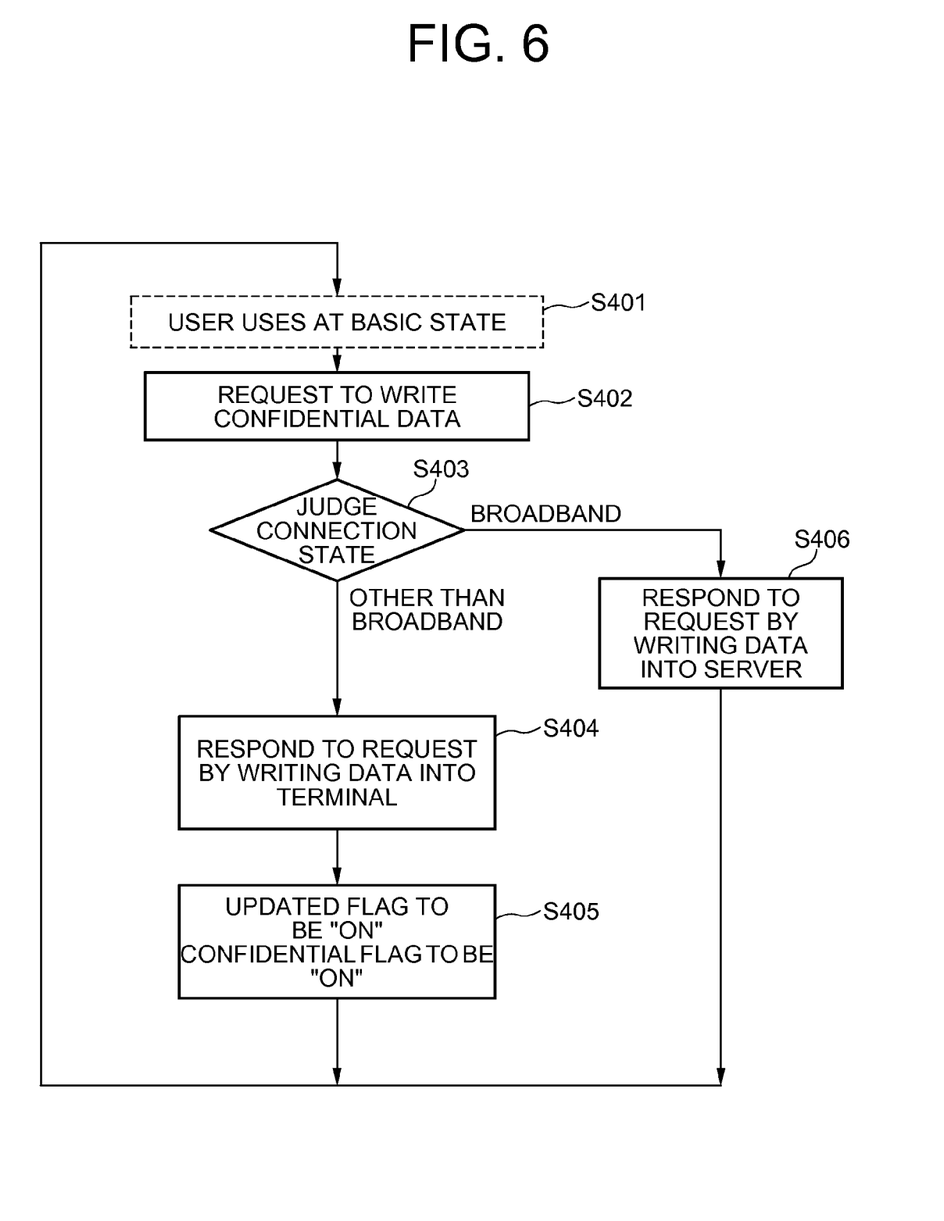
FIG. 6 is a flowchart showing the write-in operation of the confidential data when the data transfer from the mobile terminal to the server is performed by the indirect transfer function or the direct transfer function according to the first exemplary embodiment of the invention.

FIG. 6 is a flowchart showing a flow of operations in a case when: the user uses the mobile terminal 1 into the basic state; the write-in request of the confidential data in the terminal data storing device is issued from the user or the data processing device; and the indirect transfer unit 124 and direct transfer unit 125 are used.

It is assumed that the user's mobile terminal 1 is used in the basic state, for example (step S401), and when the confidential data write-in request is issued (step S402), the connection state judging device 16 judges a current connection state at first (step S403).

When the mobile terminal 1 is connected to the server 2 with the broadband, the confidential data write-in request is sent to the server 2 as it is, and the data which is sent accordingly is written into the server data storing device 23 of the server 2 (step S406). When the mobile terminal 1 is not connected, or connected with the narrowband, the confidential data write-in request is processed in the mobile terminal 1, stored in the terminal data storing device 14 of the mobile terminal 1 (step S404) with the updating flag being "on" and the confidential flag being "on" (step S405). Other operations are the same as in the case of FIG. 3 described above.

As described above, the flowcharts shown in FIG. 3 to FIG. 6 are operational flowcharts explaining the cases when the user data is read out from the server data storing device 23 of the server 2 to the mobile terminal 1 and when the user data is written into the server data storing device 23 of the server 2 from the terminal data storing device 14 of the mobile terminal 1 under various conditions, and the procedure shown by the flowcharts corresponds to a user data transfer step.

Figure 7:
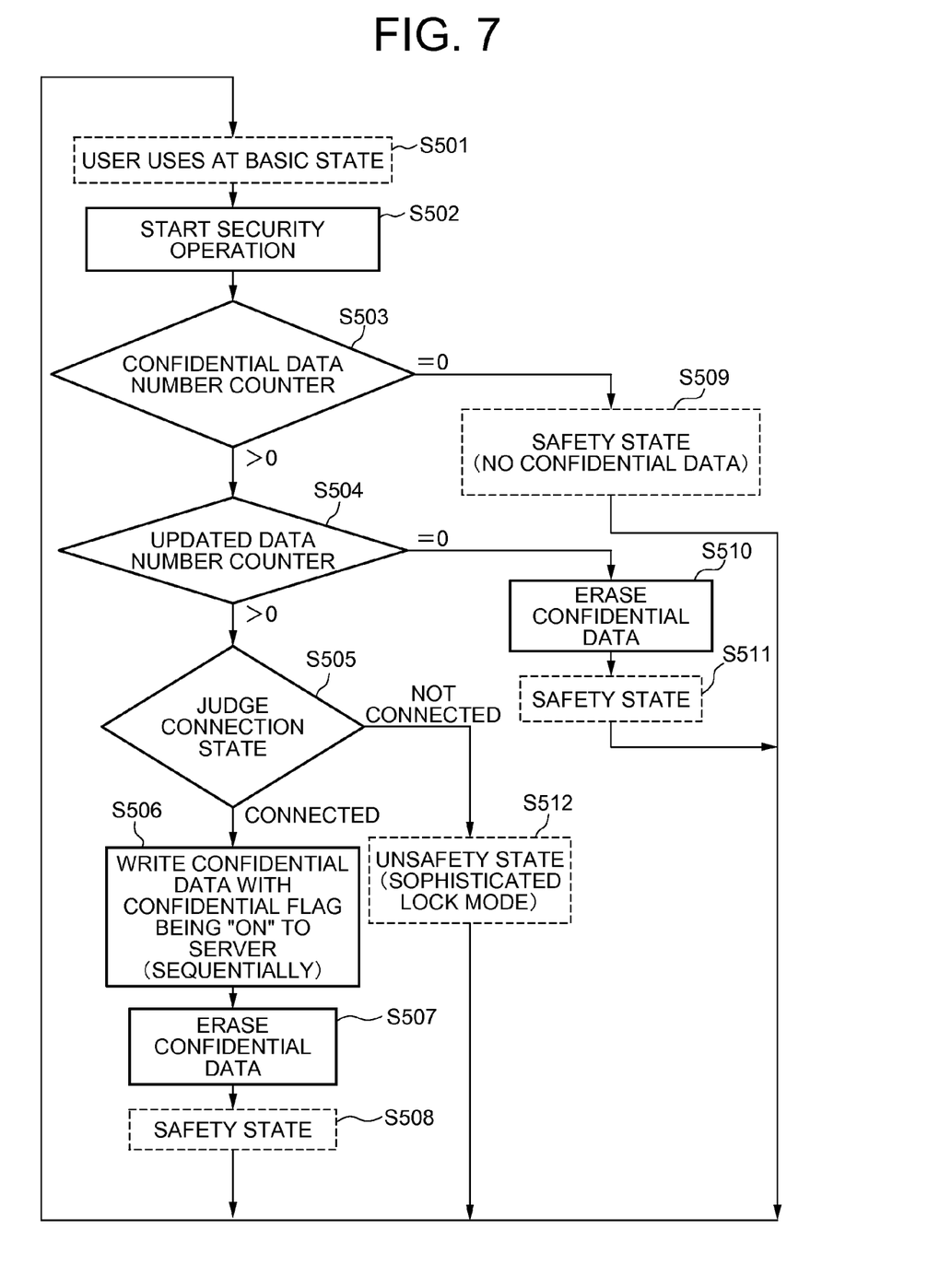
FIG. 7 is a flowchart showing the security operation according to the second exemplary embodiment of the invention.

FIG. 7 is a flowchart showing a flow of the operations of the mobile terminal 1 according to the first exemplary embodiment of the invention in such a case that, when the mobile terminal 1 is used in the basic state (step S501), the user ceases the use of the mobile terminal 1 and starts up a security operation to keep the mobile terminal 1 in a safety state, and the security operation executing unit 113 is in operation (step S502: security operation starting step).

First, a count number of the confidential data number counter indicating the number of pieces of data whose confidential flag is "on" in the terminal data storing device 14 within the mobile terminal 1 is referred to (step S503).

When the number is zero, it is found that the confidential data is not present in the mobile terminal 1. Accordingly, the mobile terminal 1 is considered to be safe as it is, which means the security operation is completed (step S509).

When the count number of the confidential data number counter is one or more, it is found that the confidential data is present in the mobile terminal 1, and in this case, the procedure proceeds to step S504. Then, an updated data number counter indicating the number of pieces of data whose updated flag is "on" in the terminal data storing device 14 within the mobile terminal 1 is referred to. When the number is zero, it is found that the data required to be written into the server is not present in the mobile terminal 1. In this case, all pieces of the data whose confidential flag is "on" in the terminal data storing device 14 are erased by a previous confidential data erasing unit 1131 (step S510). With this, the confidential data is not present in the mobile terminal 1, and the mobile terminal 1 is considered to be safe, which means the security operation is completed (step S511).

When both of the count numbers of the confidential data number counter and the updated data number counter are one or more, it is found that the updated confidential data is present in the mobile terminal 1. In this case, the procedure proceeds to step S505, and the connection state between the mobile terminal 1 and the server 2 is checked by the connection state judging device 16 (connection state judging step).

When both are connected, the data whose update flag is "on" in the terminal data storing device 14 in the mobile terminal 1 are sequentially written into the server data storing device 23 of the server 2 by an updated confidential data transfer unit 1132. The confidential data write-in request is sent to the server 2 by the indirect transfer unit 124 of the data access managing device 12 of the mobile terminal 1, and the data which is sent accordingly is written into the server data storing device 23 of the server 2 (step S506).

After all pieces of the date whose update flags are "on" are written into the server 2, all pieces of the data whose confidential flags are "on" in the terminal data storing device 14 are erased by the previous confidential data erasing unit 1131 (step S507). With this, the confidential data is not present in the mobile terminal, and the mobile terminal 1 is considered to be safe, which means the security operation is completed (step S508).

When the connection state judging device 16 judges that the mobile terminal 1 and the server 2 are not connected even though the number indicated by the updated data counter is one or more, the mobile terminal 1, which is in the not-safety state, enters a sophisticated lock mode in step S512. In the sophisticated lock mode, a sophisticated lock unit 1133 is operated, and when the mobile terminal 1 is intended to be used, an operation which makes it difficult for a person other than the authorized user to use the mobile terminal 1, such that the lock can be released only by an authentication with a password longer than a usually used one or by a biometric authentication, which provides higher reliability and higher security, is forcibly required. Here, a series of operations from step S506 to step S512 corresponds to a confidential data processing step.

In particular, when the user is not using the mobile terminal 1, and if the mobile terminal 1 is lost, the possibility of information leak with which personal information and the like are viewed by others to be leaked can be reduced by storing the confidential data, which is required to be protected, not in the mobile terminal but on the server. Note that the security operation may be started automatically at the time when the operation of the mobile terminal 1 is completed, in addition to the time when the user starts the security operation.

(Second Exemplary Embodiment)

FIG. 8 is a block diagram showing a basic configuration of the second exemplary embodiment of the invention. The second exemplary embodiment of the invention includes a mobile terminal 5 and a server 6 connected to the mobile terminal 5 via a communication network 7.

The server 6 includes: a server main controller 61 which controls the entire server; a server data access managing device 62 which manages a data transfer and the communication in the server; a server data storing device 63 which stores the data in the server; and a server communication device 64 which connects the communication with the mobile terminal 5.

Meanwhile, the mobile terminal 5 includes: a data processing device 51 which performs a control of the entire terminal device and data processing; a data access managing device 52 which manages a data transfer and the communication in the terminal; a user interface device 53 which controls a data transfer between an input device 59 to which data is inputted by a user and a display device 58 which displays an output to the user; a terminal data storing device 54 which stores the data; a terminal communication device 55 which connects a communication with the server 6 or other mobile terminal via a communication network 7; a connection state judging device 56 which judges a connection state with the server 6 via the terminal communication device 55; and a security operation start device 57 which instructs to execute a predetermined security operation to the data processing device 51 via the data access managing device 52 when the mobile terminal 5 is folded or a no-operation time reaches to a prescribed time, by an input from the user or a start up operation from a folding operation judging unit 57A or a no-operation timer mechanism 57B.

The second exemplary embodiment differs from the first exemplary embodiment in that: in the first exemplary embodiment, the security operation is started when the user instructs the security operation to the mobile terminal clearly, but in the second exemplary embodiment, the security operation is started automatically by providing the folding operation judging unit 57A and the no-operation timer mechanism 57B, to reduce the possibility of the mobile terminal 5 to be at risk when the user forgets to start the security operation carelessly. Other operations are the same as those of the first exemplary embodiment.

During the user uses the terminal, the key input to the user interface device 53 is performed if only intermittently. However, when the user ceases the use, the input is stopped for a relatively long time, and when the terminal is a folding type one, the mobile terminal 5 is folded.

The no-operation timer mechanism 57B detects the fact that the input is not performed and no-operation state continues for more than a prescribed time, and the folding operation judging unit 57A detects the fact that the mobile terminal 5 is being folded for a long time, then each of them notifies the security operation start device 57 of the fact. Upon being notified, the security operation start device 57 starts the predetermined security operation. With this, when the mobile terminal 5 is not used during a prescribed period, the security operation start device 57 operates and executes the predetermined security operation even if the user does not start the security operation.

(Third Exemplary Embodiment)

With the first exemplary embodiment and the second exemplary embodiment described above, since the write-in operation to the server and an erasing operation of the confidential data, required when the security operation is started, are performed at once, it takes time to complete the operations and to be in the safety state.

To avoid this disadvantage, a third exemplary embodiment of the invention is configured such that, even when the user continuously uses the terminal, the above-described operations are performed at a background of the normal operation within the limits of the processing ability and bandwidth of the connection line of the mobile terminal. A configuration of the third exemplary embodiment is the same as that of the first exemplary embodiment shown in FIG. 1.

Figure 9:
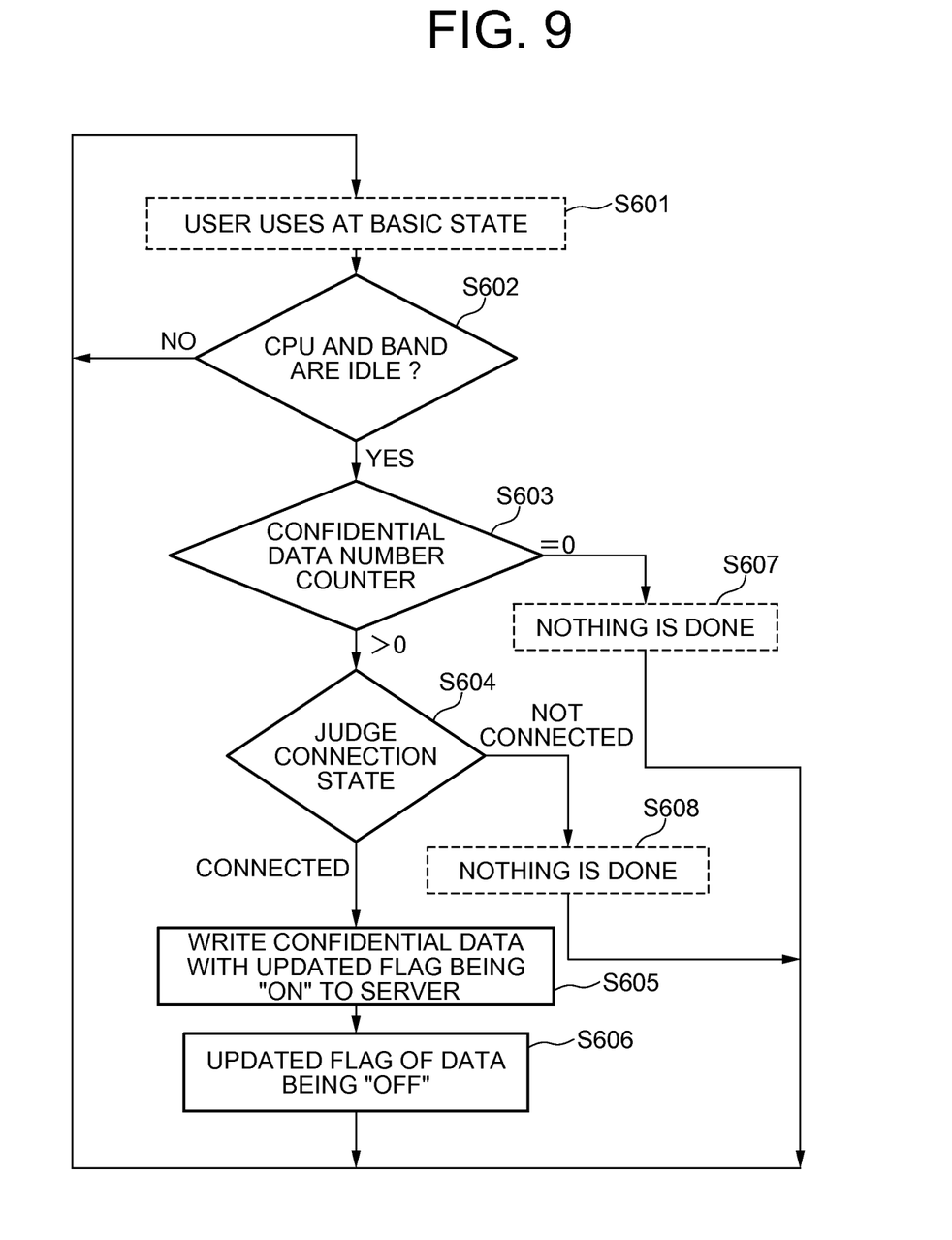
FIG. 9 is an operational flowchart showing a case in which the data transfer from the mobile terminal to the server is performed at a background of the normal operation according to the third exemplary embodiment of the invention.

FIG. 9 is a flowchart showing the operation in this case. It is assumed that, in the third exemplary embodiment, the user's mobile terminal is used in the basic state, for example (step S601). When the terminal is in operation, it is checked whether the processing ability of CPU and bandwidth of the connection line of the mobile terminal have some leftover (step S602).

When there is some leftover, the procedure proceeds to step S603, and the count number indicated by the confidential data number counter in the terminal data storing device is checked. If the count number indicated by the confidential data number counter is more than zero, the procedure proceeds to step S604, and the line connection state is judged. When it is connected, the data whose updated flag and confidential flag are both being "on," stored in the terminal data storing device, is written into the server data storing device sequentially to be stored. Then, the updated flag of the data which is stored in the server data storing device is changed to be "off." Meanwhile, when the confidential data number counter indicates zero in step S603, the procedure proceeds to step S407, and, when it is judged not to be connected in step S604, the procedure proceeds to step S608. In both cases, the state of the mobile terminal returns to the basic state of step S601 while nothing is done.

This flow is executed repeatedly, and if there is the data whose updated flag is "on," operations to write the data into the server sequentially and change the updated flag to be "off" are executed steadily. With this, the number of pieces of data remained when the security operation is started, whose updated flags and confidential flags are both being "on," can be decreased, and therefore, the load of the security operation can be reduced. Here, the confidential data in the terminal data storing device may be erased at the same time in step S606.

In the above explanation, the communication system including the mobile terminal of the present invention and the security system are described. However, an execution content of each step in the security method described above may be programmed to be executed by a microprocessor (computer) of the mobile terminal. With this, a security effect which is similar to an effect obtained with the above described method can be obtained.

With this exemplary embodiment, the confidential data is stored in the server when the mobile terminal is not used by the user or when the mobile terminal is used with the line being connected to the server. Further, when the confidential data is read out to the terminal data storing device and accessed, once the security operation inputted from outside is started or the operation of the mobile terminal is completed, the confidential data which is remained in the terminal as being read out is erased, the confidential data which is newly created and updated is written into the server and erased from the mobile terminal, and if the line to the server is not in the connection state, the confidential data is stored in the terminal by performing the sophisticated lock. With this, it is possible to present the communication system including the mobile terminal with which: the confidential information is secured from being read by others when the mobile terminal is lost; newly created and updated confidential data is not erased; and the security operation can be realized at low cost by its basic data transfer unit. Also, the security method executed by the communication system and the program therefor can be presented.

Further, in each exemplary embodiment described above, the security operation is performed on the base of the normal data transfer unit without providing special devices and configurations. Therefore, the cost for realizing the security function can be reduced.

Next, another exemplary embodiment of the invention will be described. A communication system according to another exemplary embodiment of the invention may be a system including a plurality of mobile terminals and a server which can communicate with the mobile terminals, in which: the server includes a server data storing device having a user data storing area for storing user data which contains confidential data set in advance corresponding to each of the mobile terminals; the mobile terminal includes a calculation control unit which performs calculation processing and transfer of data containing the user data, a terminal data storing device which stores the user data, and a connection state judging device which judges the line connection state with the server; where the calculation control unit performs writing/reading of the user data directly with respect to the server data storing device when the connection state judging device judges that the line connection state is a broadband connection which is enough for the data transfer, and performs writing/reading of the user data with respect to the server data storing device after storing the user data in the terminal data storing device temporarily when the connection state judging device judges that the connection state is a narrowband connection which is at a normal dial up level.

With this, even if the mobile terminal is lost, the data is not lost and the confidential information can be secured from being read by others by configuring the system in such a manner that, by storing the confidential data in the user data storing area of the server normally, the user accesses the data stored in the server directly when the communication line has some leftover and the user can access to the server directly, and the user accesses the confidential data by reading out the data to the terminal data storing device temporarily when the communication line has no leftover and the user cannot access to the server directly.

Here, the calculation control unit may be configured to include a data transfer destination selecting function for selecting either the direct transfer function or the indirect transfer function based on the judgment result of the connection state judging device. Also, the calculation control unit may be configured so as to store the user data in the terminal data storing device during the mobile terminal is being used when the line is determined not to be connected based on the judgment result of the connection state judging device.

With this, even if the mobile terminal is lost, the possibility of the confidential information to be read by others can be reduced by configuring the system in such a manner that, when the mobile terminal is being used, the calculation control unit transfers the data to the user data storing area of the server as much as possible based on the judgment result of the connection state judging device, so as not to leave the confidential data in the terminal data storing device of the mobile terminal.

Here, the calculation control unit may be configured to perform the security operation set in advance based on a detection of either a security operation starting instruction signal inputted from outside or an operation completion signal indicating a lapse of a predetermined time after the mobile terminal completed the operation. This security operation may include: an operation to erase the confidential data which is remained as being read out from the server data storing device, from among the confidential data stored in the terminal data storing device; an operation to update the storing content of the server data storing device by transferring updated confidential data which is newly created and updated by the data processing device, from among the confidential data, and then erase the updated confidential data from the terminal; and an operation to store the updated confidential data into the terminal data storing device again by setting a sophisticated data lock to the updated confidential data when the connection state judging device judges the line is not in the connection state and the updated confidential data is not able to be transferred.

With this, even if the mobile terminal is lost, the data is not lost and the confidential information can be secured from being read by others, and even when the mobile terminal and the server cannot be connected, the newly created and updated confidential data can be stored without being lost, by configuring the system in such a manner that: the confidential data remained as being read out from the server is erased in accordance with the security operation starting instruction issued by the user or the completion of the use of the mobile terminal; the newly created and updated confidential data is written into the user data storing area in the server and then erased from the terminal; and, when above described operations are not be able to perform, the confidential data is stored in the terminal by setting a sophisticated data lock with higher security.

Further, the calculation control unit may be configured to include: a confidential data managing function for putting a confidential flag to the confidential data stored in the terminal data storing device, and counting and managing the number of pieces of the data; and an updated data managing function for adding an updated flag to the updated confidential data which is newly created and updated but not stored in the server data storing device yet, and counting and managing the number of pieces of the data (claim 5).

With this, the confidential data and the updated confidential data are managed easily, and the security operation can be facilitated.

Also, a security method according to another exemplary embodiment of the invention may be configured to be a method for a communication system which includes a plurality of mobile terminals containing terminal data storing devices and a server containing a server data storing device having a user data storing area storing user data including confidential data which is set in advance corresponding to each of the mobile terminals, where respective devices are communicable with each other, the method comprising: transferring user data between the user data storing area and the terminal data storing device; starting a security operation for the confidential data based on a detection of either a security operation starting signal which is inputted from outside or an operation completion signal indicating a lapse of a predetermined time after the mobile terminal completed the operation; checking a line connection state with the server at a time when the security operation is started; and executing a confidential data processing such as an erasing or transferring processing of the confidential data stored in the terminal data storing device according to the line connection state judged when judging this connection state and a history of the confidential data.

Here, in the confidential data processing step, erasing the confidential data which is remained as being read out from the server data storing device, from among the confidential data stored in the terminal data storing device; when the line to the server is judged to be in the connection state in the connection state judging step, transferring the updated confidential data newly created and updated in the mobile terminal to the server data storing device and erasing the updated confidential data from the terminal data storing device; and when the line to the server is judged not to be in the connection state in the connection state judging step, storing the updated confidential data into the terminal data storing device again after setting a sophisticated data lock to the updated confidential data.

With this, a security method with which the data is not lost and the confidential information can be secured from being read by others, even if the mobile terminal is lost, can be realized by configuring the method in such a manner as: storing the confidential data in the server as far as the processing ability permits and reading out the data when being used; when starting the security operation or completing the operation, erasing or transferring the confidential data according to the line connection state and the history of the confidential data; and, when the line to the server is not in the connection state, storing the confidential data by setting the sophisticated data lock.

Also, a security program according to another exemplary embodiment of the invention is a program which may be configured to cause a computer provided to the mobile terminal communicable with the server to execute: a security operation starting function for starting a security operation based on a detection of either a security operation starting signal which is inputted from outside or an operation completion signal indicating a lapse of a predetermined time after the mobile terminal completed the operation; a connection state judging function for checking a line connection state with the server at a time when the security operation is started; and a confidential data processing function for erasing or transferring the confidential data according to the line connection state judged with the connection state judging function and a history of the confidential data set in advance.

Here, the confidential data processing function may be configured such as: when the connection state judging function judges that the line is connected, erasing the confidential data which is remained as being read out from the server; erasing the updated confidential data newly created and updated in the mobile terminal from the terminal data storing device of the mobile terminal after transferring the updated confidential data to the server; and, when the line to the server is judged not to be in the connection state in the connection state judging function and the data is not able to be transferred to the server, storing the updated confidential data in the terminal data storing device again after setting a sophisticated data lock to the updated confidential data.

With this, it is possible to realize a program which causes a computer to execute security functions of: storing the confidential data in the server as far as the processing ability permits and reading out the data when being used; erasing or transferring the confidential data when starting the security operation or completing the operation according to the line connection state and the history of the confidential data; and storing the confidential data in the terminal by setting the sophisticated data lock when the line to the server is not in the connection state. Consequently, even if the mobile terminal is lost, the data is not lost and the confidential information can be secured from being read by others.

While the invention has been described with reference to exemplary embodiments (and examples) thereof, the invention is not limited to these embodiments (and examples). Various changes in form and details which are understood by those skilled in the art may be made within the scope of the present invention.

The present application claims priority based on Japanese Patent Application No. 2007-028586 filed on Feb. 7, 2007, the entire disclosure of which is incorporated herein.

Industrial Applicability

With the present invention, since the confidential data of the mobile terminal is stored in the server side and the information is secured from being leaked even when the mobile terminal is lost, the present invention is possible to be widely applied to industrial fields such as the communication using the mobile terminal.

Reference Numerals

1, 5 Mobile terminal
2, 6 Server
3, 7 Communication network
11, 51 Data processing device
12, 52 Data access managing device
13, 53 User interface device
14, 54 Terminal data storing device
15, 55 Terminal communication device
16, 56 Connection state judging device
17, 57 Security operation start device
22, 62 Server data access managing device
23, 63 Server data storing device
24, 64 Server communication device

The invention claimed is:

1. A mobile terminal that allows a server to manage confidential information, the confidential information being updated by the mobile terminal, the mobile terminal comprising:
a calculation control unit that manages transfer of data or communication performed within the mobile terminal, and transmits/receives communication information to/from the server only when a connecting relation between the mobile terminal and the server is in an optimum state for at least one of: downloading the communication information from the server to the mobile terminal, and uploading the communication information to the server from the mobile terminal;
a terminal data storing device that stores data including the confidential information transferred from the server;
a data processor that updates the data to be stored in the terminal data storing device by creating or editing the data;
a security operation start device that detects whether a no-operation time has reached a prescribed time; and
a security operation executing device that determines, when the security operation start device detects that the no-operation time has reached the prescribed time, whether the data is confidential, transfers the data to the server as the confidential information when the data is determined to be confidential, and then erases the data.

2. The mobile terminal as claimed in claim 1, wherein the security operation executing device transfers the confidential information including information updated with the communication to the server.

3. The mobile terminal as claimed in claim 1, wherein the security operation executing device starts operation after a communication is completed.

4. The mobile terminal as claimed in claim 1, wherein the security operation executing device transfers information that is designated as confidential data by a user to the server as the confidential information.

5. The mobile terminal as claimed in claim 1, further comprising a data access managing device that performs communication by temporarily storing the confidential information received from the server based on a request sent to the server in the terminal data storing device, wherein the security operation executing device transfers the confidential information to the server when the
communication is completed.

6. A non-transitory computer readable recording medium storing a security program for causing a microprocessor of a mobile terminal, which transfers/receives confidential information to/from a server that manages the confidential information, to execute the functions of:
managing transfer of data or communication performed within the mobile terminal, and transmitting/receiving communication information to/from the server only when a connecting relation between the mobile terminal and the server is in an optimal state for: downloading the communication information from the server to the mobile terminal; and, uploading the communication information to the server from the mobile terminal;
updating data including the confidential information received from the sever, and temporarily storing the data in a terminal data storing device;
detecting whether a no-operation time has reached a prescribed time; and
determining whether the data is confidential when the no-operation time is detected as having reached the prescribed time, transferring the data to the server as the confidential information when the data is determined to be confidential, and then erasing the data.

7. The non-transitory computer readable recording medium storing the security program as claimed in claim 6, for further causing the microprocessor to execute the functions of transferring the data to the server when the communication is completed, and then erasing the data.

8. The non-transitory computer readable recording medium storing the security program as claimed in claim 6, for further causing the microprocessor to execute the functions of managing information updated with the communication and including the updated information into the confidential information.

9. The non-transitory computer readable recording medium storing the security program as claimed in claim 6, for further causing the microprocessor to execute the function of transferring information designated as confidential data by a user to the server as the confidential information.

10. A communication method using a mobile terminal that allows a server to manage confidential information updated by the mobile terminal, the method comprising:
managing transfer of data or communication performed within the mobile terminal, and transmitting/receiving communication information to/from the server only when a connecting relation between the mobile terminal and the server is in an optimum state for: downloading the communication information from the server to the mobile terminal; and, uploading the communication information to the server from the mobile terminal;
storing data including the confidential data transferred from the server;
updating the data to be stored by creating or editing the data;
detecting whether a no-operation time has reached a prescribed time; and
determining, when no-operation time is detected to have reached the prescribed time, whether the data is confidential, transferring the data to the server as the confidential information when the data is determined to be confidential, and then erasing the data.

11. A communication system including a mobile terminal and a server for managing confidential information updated by the mobile terminal,
wherein the server stores the confidential information transferred the mobile terminal, and transfers the storing confidential information to the mobile terminal in response to a request from the mobile terminal, and
wherein the mobile terminal includes:
a calculation control unit that manages transfer of data or communication performed within the mobile terminal, and transmits/receives communication information to/from the server only when a connecting relation between the mobile terminal and the server is in optimum state for: downloading the communication information from the server to the mobile terminal; and, uploading the communication information to the server from the mobile terminal;
a terminal data storing device that stores data including the confidential information transferred from the server;
a data processor that updates the data to be stored in the terminal data storing device by creating or editing the data;
a security operation start device that detects whether a no-operation time reaches a prescribed time; and
a security operation executing device that determines, when the security operation start device detects that the no-operation time has reached the prescribed time, whether the data is confidential, transfers the data to the server as the confidential information when the data is determined to be confidential, and then erases the data.

* * * * *